United States Patent

[11] 3,576,436

[72] Inventor Arwin B. Lindquist
Poughkeepsie, N.Y.
[21] Appl. No. 767,944
[22] Filed Oct. 16, 1968
[45] Patented Apr. 27, 1971
[73] Assignee International Business Machines Corporation
Armonk, N.Y.

[54] METHOD AND APPARATUS FOR ADDING OR SUBTRACTING IN AN ASSOCIATIVE MEMORY

13 Claims, 6 Drawing Figs.

[52] U.S. Cl. .......... 235/168, 235/173, 340/172.5, 340/173
[51] Int. Cl. .......... G06f 7/38, G11c 15/00
[50] Field of Search .......... 235/168, 173, 175; 340/172.5, 173 (AM)

[56] References Cited

UNITED STATES PATENTS 3,141,964 7/1964 Fleisher, et al. .......... 235/175X
3,505,511 4/1970 Campano, et al. .......... 235/168X
3,350,698 10/1967 Pritchard, Jr. .......... 340/172.5
3,320,592 5/1967 Rogers, et al. .......... 340/172.5

*Primary Examiner*—Eugene G. Botz
*Assistant Examiner*—Charles E. Atkinson
*Attorney*—Hanifin and Jancin ABSTRACT: Disclosed is a method and apparatus for simultaneously adding or subtracting a number from one or more words in an associative memory. The apparatus includes an entry register containing information to be compared with or read into the words in the memory, a mask register for selecting which bits in the entry register will be gated to the words in the associative memory, a backup register for storing the contents of the entry and other registers and backup gates responsive to the contents of the backup register and sequential control signals for establishing in each cycle the correct contents within the mask and entry registers. With the above associative memory apparatus, the method of adding a number to each selected word in memory is carried out by complementing in each memory word the lowest-order 0 and all 1 bits to the right (lower order) of it. The method of subtracting a number from each selected word in memory is carried out by complementing in each word the lowest-order 1 and all 0 bits to the right (lower order) of it. The method is carried out simultaneously for all words in memory using only one interrogate and one write step for each bit within a memory word.

INVENTOR
A. BRUCE LINDQUIST

BY David E. Lovejoy

AGENT

CONTROL UNIT

DETECT OVERFLOW

METHOD AND APPARATUS FOR ADDING OR SUBTRACTING IN AN ASSOCIATIVE MEMORY

BACKGROUND OF THE INVENTION

This invention relates to the field of associative memories and particularly to a method and apparatus for efficiently performing addition and subtraction within associative memories.

In general, associative memories are organized into a plurality of words where all words in the memory, or any selected number thereof, may be processed in a single operation whose duration is logically independent of the number of words in the memory. The selected number of words out of the whole set of words to be processed may be designated during an interrogation of all words in memory. The interrogation is carried out with an external key and any word which compares with that key is marked in a match indicator, there being one for each memory word. The ability to perform the simultaneous comparing exists because of the distribution of comparison logic in each bit position throughout the entire memory. In addition to the simultaneous comparing, associative memories include the capability of simultaneously writing a word into a plurality of memory word locations.

In an associative memory having the characteristics above described, a need often arises for adding or subtracting (both being generically called "processing") a constant to all or a selected number of the words in memory. The practical utility of performing addition or subtraction within the associative memory (as distinct from processing by reading out each word from memory, adding or subtracting a value to it with a conventional external adder, and storing the result back in memory) is dependent upon the efficiency by which the addition or subtraction can be performed within the memory. The efficiency of adding or subtracting within an associative memory can be measured as a function of the number of memory interrogation and write cycles which are required to perform the addition or subtraction. The present invention improves, over the prior art, the efficiency of processing within an associative memory.

DESCRIPTION OF THE PRIOR ART

One nonassociative memory prior art approach, as previously indicated, serially reads each word to be incremented or decremented out of memory, performs the addition or subtraction with an external adder, and restores the result back in memory. This nonassociative memory approach, of course, becomes very inefficient if a number is to be identically added to or subtracted from a large number of words. Accordingly, when the number of words to be identically processed may be large, processing within the associative memory is preferred.

A number of addition or subtraction techniques for processing within an associative memory are known in the prior art. For example, an article by G. Estrin and R. Fuller entitled "Algorithms for Content-Addressable Memory Organizations" appearing in the Proceedings of the Pacific Computer Conference, Pasadena, California, Mar. 15 and 16, 1963, Pages 118—130 describes one approach. Another approach is described in the article by S. Porter entitled "Use of Multiwrite for General Programmability of Search Memories" appearing in the Journal of the Association for Computing Machinery, Vol. 13, No. 3 (July 1966) Pages 369—373. The problem with both of the approaches in the referenced articles is that they are relatively inefficient. As previously indicated, one measure of efficiency is the number of interrogation and the number of write cycles which are required to perform an operation. Recalling that associative memories are organized into a plurality of words where each word includes a given number of bits, both of the cited prior art approaches require two interrogation and write cycles per bit position to complete an addition or subtraction within memory.

While these prior art approaches may be useful under some conditions, it is desirable and it is an object of the present invention to provide a method and apparatus which is more efficient in adding or subtracting a binary constant to any number of words within an associative memory, namely, one which requires only one interrogation and write cycle per bit position.

SUMMARY OF THE INVENTION

The invention includes an associative memory having a plurality of words. Each word includes a plurality of bits where each word generally contains the same number of bits and where the words are organized in a rectangular array such that the corresponding bits in each word are addressable by common circuitry. Each word has one bit set aside as a special bit (SP). The other bits in each word are arbitrarily ordered by designations such as BIT 1, BIT 2, BIT 3, and so on where, if all bits are of interest, BIT 1 is the next-lowest order bit when processing begins, BIT 2 is the next-lowest order after BIT 1, and BIT 3 is the next-lowest order after BIT 2. Of course, if BIT 1 is not of interest, then BIT 2 may be defined as the next-lowest order bit when processing begins thereby ignoring BIT 1. Each of the words is associated with word sense and selection (WSS) circuitry. The WSS circuitry for each word operates to energize with a half-write signal all of the bits in that word. The apparatus also includes bit selection (BS) circuitry which includes an entry register, a mask register and a backup register all of which together generate half-write (or interrogate) signals which are interconnected through True/Complement gates to corresponding bit positions of each word in the associative memory.

Information to be written into or compared with words in the associative memory is placed in the entry register where it may be used as a key. The mask register controls which field of bits (from a full word to no bits) is to be written into memory or compared with words in memory. During a write operation, the coincidence of the selected bits from the bit selection circuitry and the word selection circuitry for each selected word allows the coincident writing of the entry register contents into each of those selected word locations. Alternatively, energization of the bit selection alone without any WSS energization allows a compare of the entry register contents with each word of memory. When a compare operation is performed, the word sense circuitry, which includes the match indicators, sets those match indicators to indicate which words compare with the entry register. A control unit is present controlling the operation of the bit selection and word sense selection circuitry. Both the entry and mask registers include, along with each memory word, the special bit which is used for marking words which are to be processed.

With the above associative memory apparatus, the method of adding a number to each selected word in memory is carried out by complementing in each memory word the lowest order 0 and all 1 bits to the right (lower order) of it. The method of subtracting a number from each selected word in memory is carried out by complementing in each word the lowest order 1 and all 0 bits to the right (lower order) of it.

Addition

In order to carry out the addition, each of the words in memory to be incremented is marked by setting a 1 in its special bit position. For incrementation by binary 1, the entry register is initially reset to 1 in all positions with the exception of a 0 which is set in the entry special bit position. The mask register is set to all 1's except for the lowest order bit of the field to be incremented and the special bit which are both reset to 0. Next, an interrogation is performed with the complement (0 1) of the two unmasked entry bits (1 0) where the bits in parentheses are next-lowest order and special bit, respectively. The interrogation operates to leave the match indicators set to 1 for each memory word which has a 0 next-lowest order bit and a 1 special bit. There after, using the match indicators which are set to control the word selection circuitry, the true value (1 0) of the entry register unmasked bits is written into every word which has a set match indicator. Next, the next-lowest order entry bit is unmasked, an interrogation is performed using the complement value (01 1) of the unmask entry bits thereby again setting the match indicators to indicate the words which compare and finally the true value (10 0) is written into those words. The apparatus continues to perform these interrogating and writing steps until all bits in the entry register have been unmasked.

Subtraction

For subtraction, the entry register is set to all 1's, the special bit and the lowest order bit are unmasked and the memory is interrogated for matches with the true value. The complement of the entry register is written into all matching words and thereafter the next lowest-order entry bit is unmasked, the true interrogation is performed, and the complement again written. The apparatus performs these steps until all bit positions in the entry register have been unmasked.

It is evident from the above summary of the invention that both an addition to or subtraction from all or selected ones of the words in an associative memory can be performed by an apparatus which carries out steps including only one interrogation and one write step for each bit per memory word. Accordingly, the object of providing an efficient associative memory device is achieved.

The foregoing and other objects, features and advantages of the invention will be apparent from the following more particular description of a preferred embodiment of the invention, as illustrated in the accompanying drawings.

DESCRIPTION OF ONE PREFERRED EMBODIMENT

Figure 1:
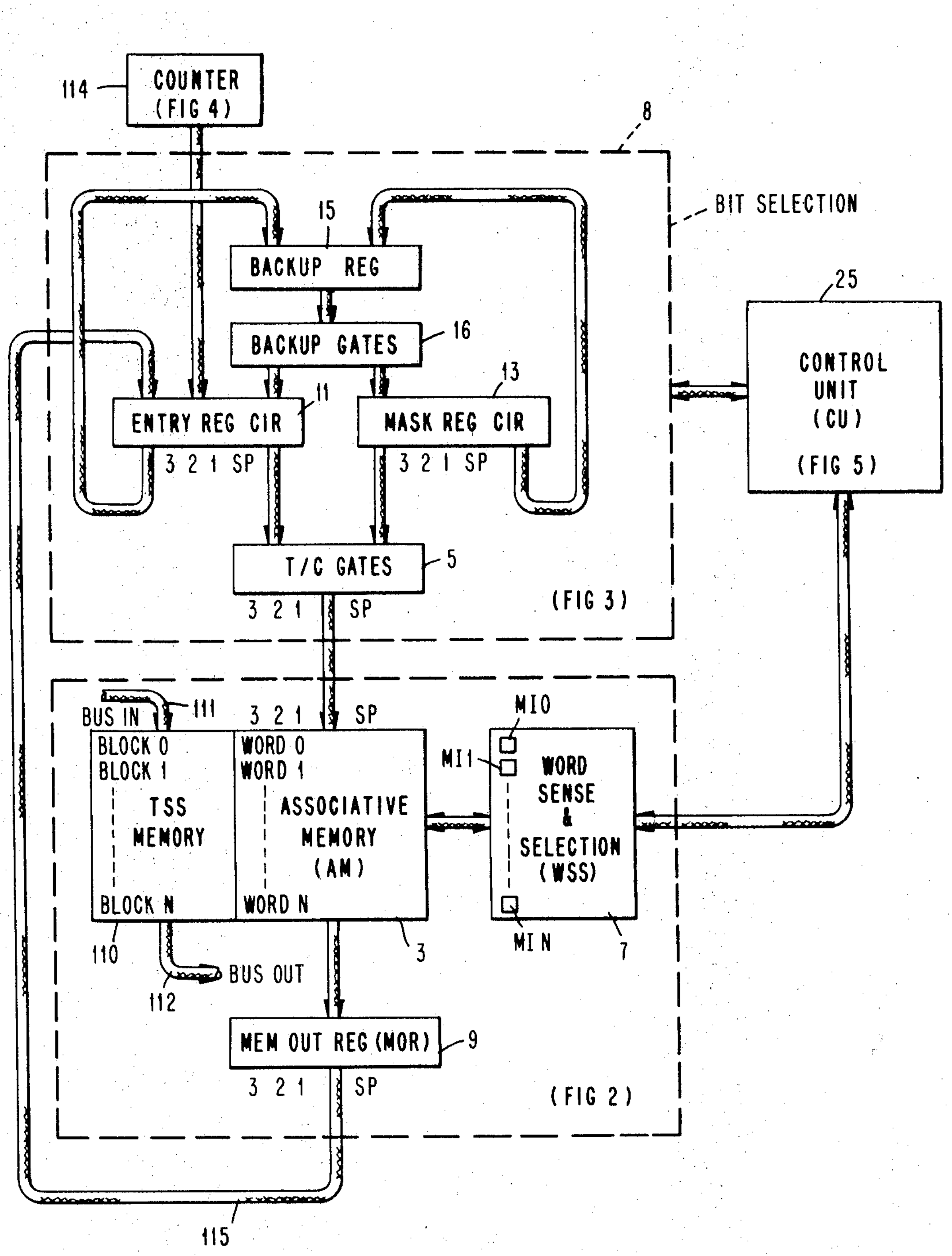
FIG. 1 depicts an overall block diagram of the various components of the invention.

Associative memory configurations, similar to that of FIG. 1, and their basic operations of reading, writing and interrogating (comparing) are known in the prior art. Examples of such systems are described in U.S. Pat. 3,253,265 entitled "Associative Memory Ordered Retrieval" and U.S. Pat. application, Ser. No. 537,141, now Pat. No. 3,430,205 filed Mar. 24, 1966, entitled "RAMOR (Range Associative Memory With Ordered Retrieval)" invented by A. B. Lindquist and R. R. Seeber, both assigned to the same assignee as the present invention.

With reference to FIG. 1, the apparatus of the present invention includes an associative memory 3 which includes a plurality of word locations WORD 0, WORD 1,...,WORD N where each word includes a plurality of bits, BIT 3, BIT 2, BIT 1 and SP (special bit). All of the bits in every word are addressable in parallel through the true/complement (T/C) gates 5 which have corresponding bit positions 3, 2, 1 and SP. Each word is individually addressable or sensed by the word sense and selection circuitry 7. Information may be nondestructively read out, a word at a time, from the memory 3 into the memory out register (MOR) 9. Information is read out from any word in the memory to the MOR 9 by a word selection signal from the WSS circuitry 7. Information is written into the associative memory, into any number of word locations in parallel, by the coincidence of half-write signals from the bit gates 5 and corresponding half-write signals from the word selection circuitry 7. A compare or interrogation operation occurs when signals are applied to the memory from the gates 5 alone. A compare for each word is sensed in the word sense portion of the WSS circuitry 7 where there are match indicators MIO, MI1,...,MIN, one for each word in memory.

The information to be written into the memory 3 or to be compared with information in the word locations of memory 3 is placed in the entry register 11 from where it is gated through bit gates 5 to the memory 3.The entry register contains the same number of bit positions as do the words in the memory where the 3, 2, 1 and SP entry register bits are connected to all the memory BIT 3's, BIT 2's, BIT 1's and SP's, respectively. Since it may not be desirable to compare or write every bit in the entry register into the corresponding bits in the associative memory words, the mask register 13 is provided to inhibit any or all of the bits in entry register 11 from being applied to the memory 3.Both the entry register 11 and the mask register 13 may be loaded or partially loaded by the backup register 15 which itself may be loaded or partially loaded by the registers 11 and 13. Provisions are also provided for loading the entry register from the MOR 9.

The present invention concerns what bits in the entry register are compared with words in the memory 3, what bits are written into memory, and what order the comparing and writing occurs in order to perform an addition or subtraction of a constant binary value to the binary numbers stored in memory. The order and selection of bits is under the control of the bit selection circuitry shown in FIG. 1 and shown in more detail in FIG.3. A detailed discussion of the bit selection apparatus will be given in connection with FIG. 3 hereinafter. Before turning to FIG. 3, however, further details as to the associative memory 3 and the word sense and selection circuitry 7 will be given.

Memory and Word Sense and Selection

Figures 2, 4:
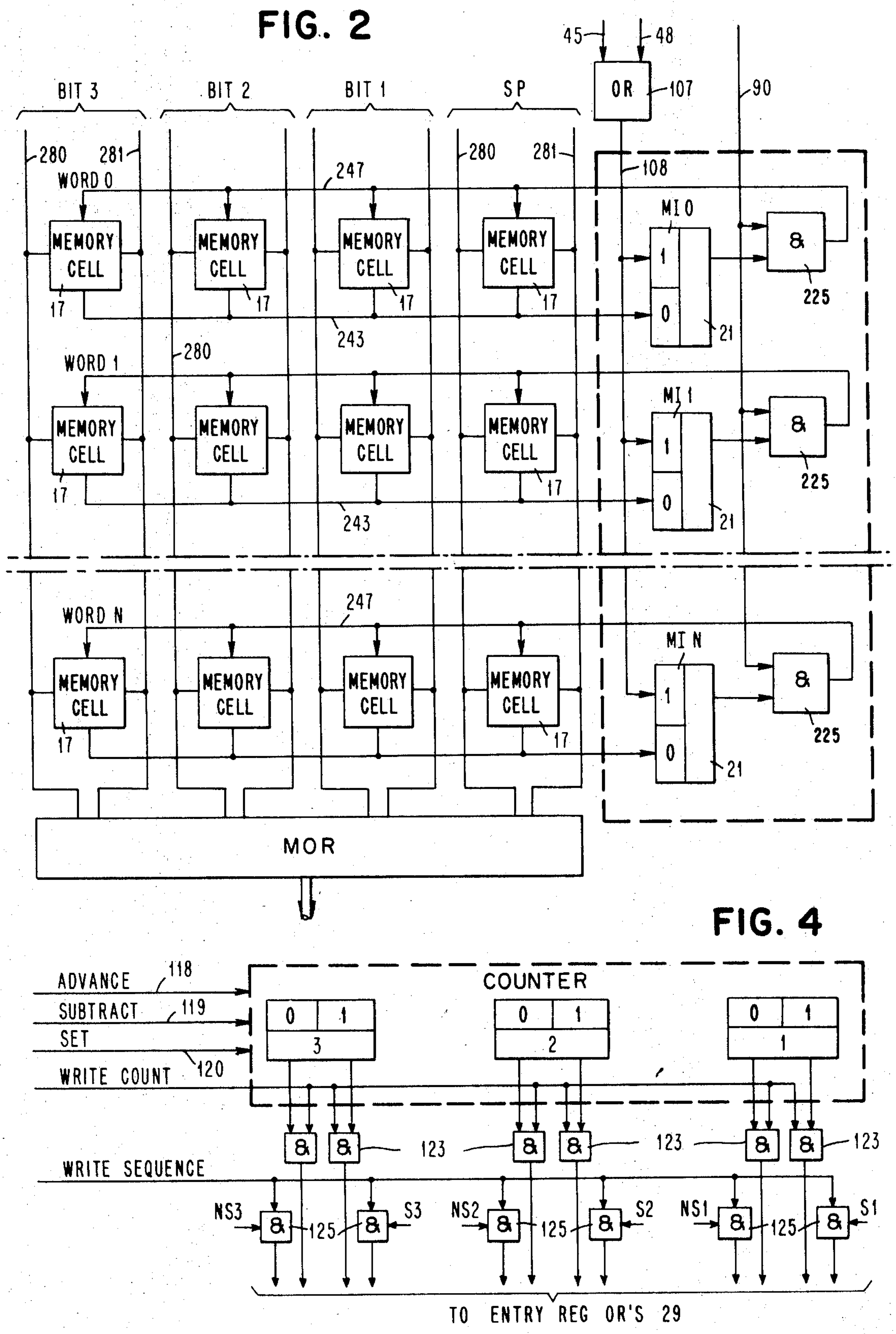
FIG. 2 depicts the associative memory, word sense and selection circuitry and memory out register of FIG. 1 in more detail.
FIG. 4 depicts the counter employed with the circuitry of FIG. 1 when the apparatus is employed to operate on a time-sharing system embodiment.

With reference to FIG. 2, the associative memory 3 comprises the words WORD O, WORD 1,...WORD N where each of the four bits BIT 3, BIT 2, BIT 1 and SP in each word consists of a memory cell 17. The details of one preferred embodiment for the memory cell 17 are shown in the copending application entitled "Monolithic Associative Memory Cell" by W. D. Pricer having Ser. No. 514,568 now U.S. Pat. No. 3,492,661 and a filing date of Dec. 17, 1965, which is assigned to the same assignee of the present invention. The details of that application are hereby incorporated by reference in this specification for the purpose of teaching the details of operation of such a memory cell in an associative memory.

Briefly, the associative memory and each memory cell for each word therein includes a word sense line 243 for sensing a mismatch in any bit position of the connected word and a word drive line 247 for applying a half-write signal to each bit position (memory cell) of the connected word. Additionally, each bit (e.g. BIT 3 for WORD 0) in every word includes a bit test zero line 280 and a bit test one line 281 for producing half-write signals (or interrogate signals). The bit lines 280 or 281 are used to write a 0 or a 1 respectively in each memory cell for those words which also have a half-write signal on the connected word drive line 247. Alternatively, during an interrogation when signals are applied only on the lines 280 and 281, line 280 will interrogate for the presence of a 1 and line 281 will interrogate for the presence of a 0. Lines 243 sense the connected memory cells for any mismatch condition. If a mismatch condition occurs, a pulse is developed on the appropriate line 243.

Each of the word sense lines 243 is connected to a match indicator (MI) 21 which is associated with the word. On detection of a mismatch pulse, the line 243 is operative to reset the associated MI into 0 thereby indicating that there was a mismatch in that word.

Figure 3:
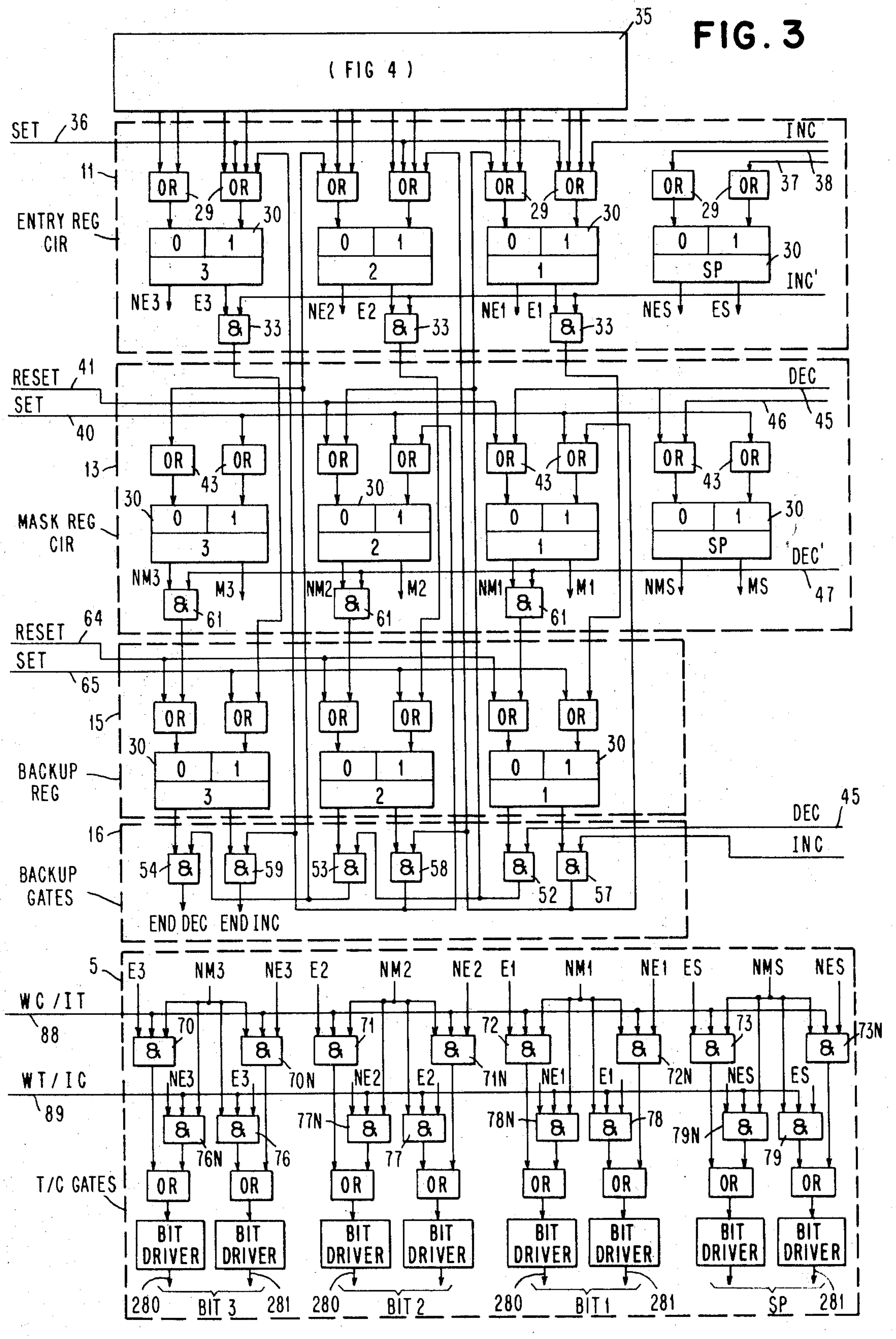
FIG. 3 depicts the bit selection circuitry of FIG. 1 and includes the backup register, backup gates, entry register, mask register and True/Complement gates and associated circuitry.

The bit lines 280 and 281 for each bit position are connected from the T/C gates 5 as shown in more detail in connection with FIG. 3.

The match indicators 21 are conventional bistable devices which are set into the 1 state by a set line 108 derived through OR 107 and line 45 or 48 from the control unit 25 of FIG. 1. The 1 output of the MI's 21 signifies that the connected word compared with the word presented on the bit lines by the T/C gates 5 as gated from the entry register 11, all of which will be discussed in more detail in connection with FIG. 3. The output from the match indicators 21 enables the AND gates 225 and allows those gates 225 to apply a half-write signal to the word drive lines 247 whenever a control signal 90 is received from the control unit 25 of FIG. 1.

It will be apparent in comparing the FIG. 2 circuit with the circuits in the copending Pricer application that a number of circuits have been omitted for clarity in FIG. 2. Those skilled in the art will recognize that the FIG. 2 circuits will include appropriate sense amplifiers and biasing sources in the same manner as in the Pricer copending application.

Bit Selection

With reference to FIG. 3 the bit selection circuitry 8 of FIG. 1 is shown in more detail. The bit selection circuitry includes three registers, namely the entry register circuitry 11, the mask register circuitry 13 and the backup register circuitry 15. Each of the registers is conventional and includes for each bit position binary element 30 which is settable in either the 0 or 1 position. In addition to the three registers and their associated interconnecting circuitry, the bit selection circuitry 8 includes the backup gates 16 and the True/Complement gates 5.

The entry register is connected to the T/C gates 5 and also to the backup register circuitry 15. Each bit position has either a 0 or a 1 output. With the 1 output, for example, the third bit has an E3 output and when in the 0 position has a NE3 output. Similarly, the entry register second bit position has E2 and NE2 outputs. The special bit, SP, has a ES output when in the 1 condition and a NES output when in the 0 position. The E regular outputs (bits 1, 2 and 3) are connected through gates 33 to the 1 inputs of the corresponding bit positions in the backup register. Additionally, the E outputs from the entry register are also connected to the corresponding True/Complement gate bit positions. Similarly, the NE positions of the ENTRY register are connected to the True/Complement gates.

The bit positions of the entry register 11 can have various inputs from the counting circuitry 114 which will be discussed in more detail in connection with FIG. 4. Additionally, the 1 position of all of the register bits can be set by the SET input 36 from the control unit 25 of FIG. 1. The special bit for the entry register can be set to 1 by input 37 or reset to 0 by input 38 both connected to control unit 25 of FIG. 1.

Similar to the entry register, the mask register 13 has outputs M or NM for 1 and 0 outputs, respectively, for each of the bit positions. All of the M outputs are connected to their respective True/Complement gates for the particular bit in question. Additionally, the NM outputs are connected to appropriate True/Complement gates and also to the corresponding 0 inputs of the backup register.

The mask register has a SET input 40 to set each of the bit positions in the 1 state. Additionally, the mask register includes a RESET input 41 for setting all but the highest order mask bits and the special bit. SP, to the 0 state. While the embodiment of the present invention includes registers and words in memory which are only four bits in length (three regular bits and one special bit), it is merely a matter of choice as to the number of bits which are contained in the words and in the registers. If registers and words with a larger number of bits were used, then of course the SET input 40 and the RESET input 41 would similarly feed all of the other bit positions. Of course, the RESET input 41 would not feed the highest order bit position.

Besides the SET and RESET inputs, the mask register includes a DEC input which is applied through OR's 43 to the 0 inputs of the 1 and SP bits. Accordingly, a pulse on the DEC line 45 is operative to reset the first two mask register bits to 0 which, as explained below, is operative to unmask the first two positions in the entry register 11.

The 0 condition of all the higher order bits (bits 2 and 3) each have inputs from the 0 output of the next lowest-order bit position from the backup register under control of the backup gates 16. For example, the 0 input for the mask bit 2 is supplied from the backup gate 52 which in turn receives one of its inputs from the 0 output of the backup register 1 bit. Similarly, the 0 output of the backup register 2 bit is connected to the 0 input of the mask register 3 bit through the backup gate 53. Again, if the registers and words in memory included more bits, the backup gate 54 would connect to the next higher order register position (bit 4, not shown) and so on for each higher order bit.

Besides the 0 inputs to the mask register from the backup gates, each 1 input for the mask register bit positions except the highest order bit (the 3 bit) includes a 1 input from the 1 output of the same bit position in the backup register. For example, the backup gates 57 connect the 1 output of the backup register 1 bit to the 1 input of the mask register 1 bit. Similarly, gate 58 connects the 1 backup register output to the mask register 1 input for the 2 bit. Again, if the registers and words in memory included more bits, then gate 59 would be connected to the 1 input of the 3 bit and similarly for each higher order bit and backup gate.

The backup register 15 includes only three regular bits (bits 1, 2 and 3 and does not include a special bit. The backup register functions to store at DEC' time the contents of the mask register as gated through the mask register gates 61. Each 0 bit output NM (1, 2 or 3) is connected directly to the 0 input of the backup register bits (1, 2 and 3 respectively) through appropriate OR circuits. In a similar manner, the backup register functions to store the contents of the entry register at INC' through the gates 33 which connect the 1's of the entry register bits (1, 2 and 3) to the backup register 1 inputs for bits (1, 2 and 3) respectively. The backup register 1 inputs include a SET input 65 for setting the register to all 1's and a RESET input 64 for setting the register to all 0's.

The output of the backup register is distributed through the backup gates 52, 53 and 54 for the 0 outputs and 57, 58 and 59 for the 1 outputs as previously described. The lowest order bit position of the backup register has its backup gate 52 energized by a DEC input 45 from the control unit 25 of FIG. 1. When the 1 bit of the backup register is in the 0 condition and a DEC signal is applied on line 45, gate 52 functions to reset the 2 bit of the mask register to 0 and to set the 1 bit of the entry register to 0 through the OR 29. This resetting of the mask register bit is defined as unmasking the next-highest order entry bit. Additionally, the gate 52 applies a signal to the gate 53 which is not propagated through the gate 53 if the backup register bit 2 is in the 1 condition. However, if the bit 2 is in the 0 condition, gate 53 functions identically as gate 52 in resetting the next-highest order bit of the mask register (bit 3) to 0 (thereby unmasking the next-highest order entry bit) and the same order bit of the entry register (bit 2) to 0. As will be described in more detail under the OPERATION portion of this specification hereinafter, the DEC signal is propagated through the backup gates 52, 53 and 54 as the backup register bits are changed from 1 to 0 beginning with the lower order 1 bit and working toward the higher order bits.

The T/C gates 5 operate to energize the bit lines 280 and 281 in accord with the contents of the entry register circuitry 11 for those bit positions of the entry register which are not masked by a 1 in the corresponding bit of the mask register 13. In accord with this mode of operation, the zero lines 280 are each connected to the 1 and 0 outputs, E and NE, for the corresponding bits (bits 1, 2, 3 and SP). For example, the entry register bit 3 output NE3 is connected to the BIT 3 zero line 280 through the T/C gate 76N. Similarly, the NE3 output is connected to the BIT 3 one line 281 through the T/C gate 70N.

In a similar manner, the E3 output of the entry register BIT 3 is connected to both the 280 and 281 lines through the gates 70 and 76, respectively. Each of the other entry register bit outputs are connected to the corresponding bit lines 280 and 281 through T/C gates.

Each of the T/C gates includes an input from the 0 output of corresponding bit positions of the mask register so that the T/C gates cannot cause a signal to be applied to the bit lines 280 or 281 unless the corresponding mask bit is in the 0 (NM) state. For example, gate 70 includes the input NM3 as one of its necessary inputs. When there is a NM3 signal and a E3 signal, a pulse on the WC/IT line 88 causes the entry register 1 bit to be applied to the 0 bit line 280. Accordingly, this reversal from 1 to the 0 bit line can be used to write or interrogate the complement of the entry register into all the bit 3 locations of the words in memory. Similarly, a pulse on the WT/IC line 89 will cause the 1 in the entry register bit 3 position to be applied to the 1 line 281.

Control Unit

Figure 5:
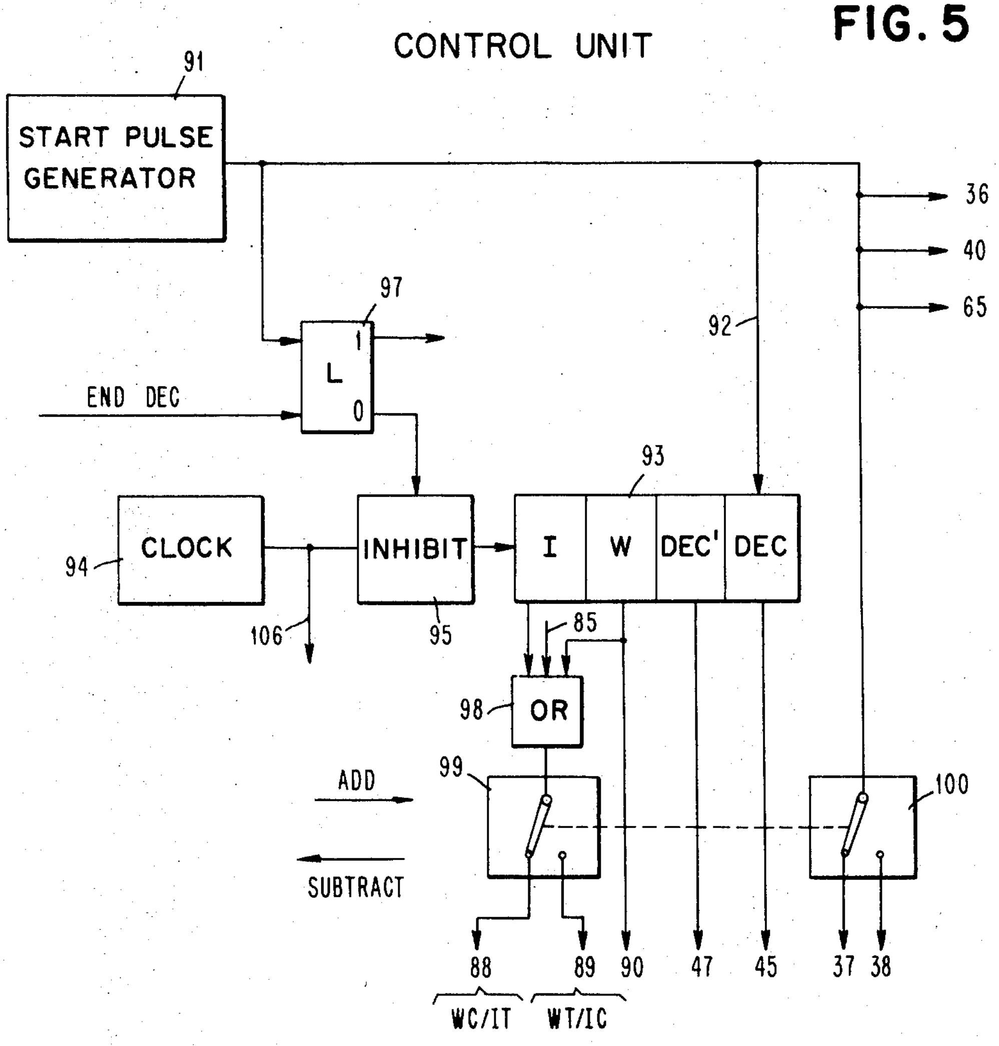
FIG. 5 depicts one embodiment of the control unit 25 in FIG. 1.

The control unit 25 of FIG. 1 is any conventional device for providing timed sequencing signals to the other components of the associative memory system. One preferred example of such a device is shown in FIG. 5. The start pulse generator 91 is used to initiate the operation of the present invention. The start pulse generator can be any appropriate circuitry such as a momentary contact switch, an output signal from some other data processing system, and many others as will be apparent to those skilled in the art.

The starting pulse output from generator 91 operates to set the entry, mask, and backup registers via the lines 36, 40, and 65, respectively. Additionally, generator 91 functions to set the shift register 93 into the DEC state. The shift register 93 includes four states, namely, I (interrogate), W (write), DEC′, and DEC. Shift register 93 operates in the conventional manner to shift a one bit serially through each of the stages and back around again under the control of the clock 94 when that clock is not inhibited from operating by conventional inhibit circuit 95. Inhibit circuit 95 inhibits the clock 94 from stepping the shift register 93 when the latch 97 is in the 0 state. Start pulse generator 91 when operated, functions to set the latch 97 in the 1 state thereby disengaging the inhibit 95 and allowing the clock 94 to shift the step register 93. Latch 97 is reset to 0 to stop the operation by the END DEC signal from AND 54 of the backup gates 16, as shown in FIG. 3.

The outputs from the shift register 93 are supplied as sequential control signals to various points throughout the memory system. The DEC stage is supplied to the DEC line 45 of mask register circuitry 13. Similarly, the DEC′ output is supplied to line 47 of the mask register circuitry. The output from the W stage is supplied to line 90 for energizing the write control gates 25 in cooperation with the respective inputs from the match indicators MI. The output from the I stage is connected through OR 98 through the switch 99 to the T/C gate inputs WC/IT 88 when in the subtract position as shown or to the WT/IC input 89 when in the alternate add position. In a similar manner, the switch 100 switches the output from the generator 91 from the connection 38 in the SP position of the entry register 11 to the input 37 when in the add mode of operation.

Figure 6:
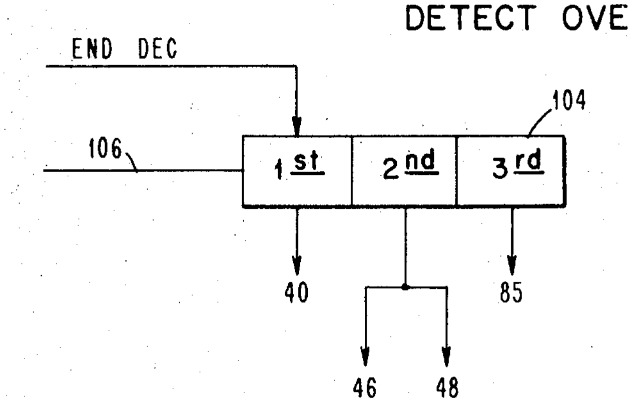
FIG. 6 depicts an addition to the control unit of FIG. 5 which addition is employed to detect those words in memory which would overflow if the addition or subtraction were carried out.

FIG. 6 depicts an addition to the control circuitry of FIG. 5 which is used to detect overflow conditions of words in memory which are in their maximum or minimum count before addition or subtraction, respectively. The FIG. 6 circuitry merely includes a three stage shift register 104 which is stepped by clock 94 of FIG. 5 via line 106 through three stages when the END DEC signal is received.

Operation

The method of adding a number to each selected word in memory is carried out by complementing in each memory word the lowest order 0 and all 1 bits to the right of it. The method of subtracting a number from each selected word in memory is carried out by complementing in each word the lowest order 1 and all 0 bits to the right of it. The above steps are carried out by setting the special bit in each word to mark the words which are to be processed. The special bit may be set in any well-known manner. One way to set the special bits is described hereinafter in connection with a time-sharing system embodiment. Of course, if all words are to be processed, then the special bits may be eliminated. Thereafter, the complementing is carried out in parallel on all words having a special bit set.

By way of illustration, the subtraction of a binary 1 in an associative memory system having a four bit word (three regular bits 1, 2 and 3 and one SP bit) is described. The initial and other bit selection conditions for subtracting a binary 1 are shown in Chart I.

CHART I—SUBTRACTION (BIT SELECTION)

| | Entry register | | | | Mask register | | | | From T/C | | | | BU register | | |
|---|---|---|---|---|---|---|---|---|---|---|---|---|---|---|---|
| | 3 | 2 | 1 | SP | 3 | 2 | 1 | SP | 3 | 2 | 1 | SP | 3 | 2 | 1 |
| Initial condition | 1 | 1 | 1 | 1 | 1 | 1 | 1 | 1 | | | | | 1 | 1 | 1 |
| Cycle 1: | | | | | | | | | | | | | | | |
| DEC | 1 | 1 | 1 | 1 | 1 | 1 | 0 | 0 | | | | | 1 | 1 | 1 |
| IT-1 | 1 | 1 | 1 | 1 | 1 | 1 | 0 | 0 | | | 1 | 1 | 1 | 1 | 1 |
| WC-1 | 1 | 1 | 1 | 1 | 1 | 1 | 0 | 0 | | | 0 | 0 | 1 | 1 | 1 |
| DEC′ | 1 | 1 | 1 | 1 | 1 | 1 | 0 | 0 | | | | | 1 | 1 | 0 |
| Cycle 2: | | | | | | | | | | | | | | | |
| DEC | 1 | 1 | 0 | 1 | 1 | 0 | 0 | 0 | | | | | 1 | 1 | 0 |
| IT-2 | 1 | 1 | 0 | 1 | 1 | 0 | 0 | 0 | | 1 | 0 | 1 | 1 | 1 | 0 |
| WC-2 | 1 | 1 | 0 | 1 | 1 | 0 | 0 | 0 | | 0 | 1 | 0 | 1 | 1 | 0 |
| DEC′ | 1 | 1 | 0 | 1 | 1 | 0 | 0 | 0 | | | | | 1 | 0 | 0 |
| Cycle 3: | | | | | | | | | | | | | | | |
| DEC | 1 | 0 | 0 | 1 | 0 | 0 | 0 | 0 | | | | | 1 | 0 | 0 |
| IT-3 | 1 | 0 | 0 | 1 | 0 | 0 | 0 | 0 | 1 | 0 | 0 | 1 | 1 | 0 | 0 |
| WC-3 | 1 | 0 | 0 | 1 | 0 | 0 | 0 | 0 | 0 | 1 | 1 | 0 | 1 | 0 | 0 |
| DEC′ | 1 | 0 | 0 | 1 | 0 | 0 | 0 | 0 | | | | | 0 | 0 | 0 |
| DEC | END SUBTRACT | | | | | | | | | | | | | | |

The initial conditions established for a subtraction are 1's in all bit positions of the entry, mask, and backup registers. The initial conditions are established by an output pulse from the start pulse generator 91 of FIG. 5 and at that time there is no output from the T/C gates 5. With a pulse from generator 91 of FIG. 5, the shift register 93 is set with a 1 in the DEC position so that the output from that position on line 45 resets the 1 and SP bits of the mask register 13 to 0 still leaving the entry and backup registers with all 1's. The start pulse from generator 91 also sets a latch 97 thereby allowing the inhibit circuit 95 to pass the clock pulses from clock 94 to the shift register 93. Shift register 93 then steps from the DEC stage to the I stage which in turn causes an interrogation pulse to be applied to the T/C gates 5 on line 88. Since only BIT 1 and SP have 0's in the mask register, the interrogation output from the T/C gates is a —1 1 (nothing in BIT 3 and BIT 2 and 1's in BIT 1 and SP) as evidenced by signals on the lines 280 of the BIT 1 and SP bits.

The next clock pulse shifts register 93 to stage W causing outputs on both lines 88 and 90 thereby causing the T/C gates to write the complement of the entry register unmasked bits, —0 0, into the associative memory via lines 280 for the BIT 1 and SP bits.

The next clock pulse shifts the register 93 to the DEC′ stage thereby energizing line 47 which gates the contents of the mask register into the backup register thereby completing the first memory cycle.

In the next stage of the shift register, the DEC line as again energized thereby changing the next-lowest order (BIT 2) 1 bit in the mask register to 0 conditioning the match indicators MI by setting the MI to 1's, and resetting the previous next-lowest entry bit (BIT 1) to 0. More particularly, BIT 2 in the mask register is changed from 1 to 0 so the mask register contains 100 0 and BIT 1 in the entry register is changed to 0 so that the entry register contains 110 1. This DEC pulse is a control signal and is operative to unmask, in each cycle, another bit (next-lowest order bit) leaving an unmasked entry field of bits which can be gated to the memory words during interrogation. That DEC pulse is also a control signal which operates to reset, in each cycle after the first, the previous next-lowest order entry bit (BIT 1 in cycle 2).

The second memory cycle continues with an interrogation of the true value of the entry register with the field of unmasked entry bits (—10 1), follows with a write of the complement of the entry register field of unmasked bits (—01 0) and completes with the updating of the backup register (100) with a DEC′ signal. Thereafter, a third memory cycle is commenced and completed giving rise to an END DEC signal from backup gate 54 which resets the latch 97 in the control unit of FIG. 5 thereby ending the subtraction.

By way of a second illustration, the addition of a binary 1 in an associative memory system having a four-bit word is described. The initial and other bit selection conditions for addition are shown in Chart II.

CHART II—ADDITION (BIT SELECTION)

| | Entry register | | | | Mask register | | | | From T/C | | | | BU register | | |
|---|---|---|---|---|---|---|---|---|---|---|---|---|---|---|---|
| | 3 | 2 | 1 | SP | 3 | 2 | 1 | SP | 3 | 2 | 1 | SP | 3 | 2 | 1 |
| Initial condition | 1 | 1 | 1 | 0 | 1 | 1 | 1 | 1 | | | | | 1 | 1 | 1 |
| Cycle 1: | | | | | | | | | | | | | | | |
| DEC | 1 | 1 | 1 | 0 | 1 | 1 | 0 | 0 | | | | | 1 | 1 | 1 |
| IC-1 | 1 | 1 | 1 | 0 | 1 | 1 | 0 | 0 | | | 0 | 1 | 1 | 1 | 1 |
| WT-1 | 1 | 1 | 1 | 0 | 1 | 1 | 0 | 0 | | | 1 | 0 | 1 | 1 | 1 |
| DEC′ | 1 | 1 | 1 | 0 | 1 | 1 | 0 | 0 | | | | | 1 | 1 | 0 |
| Cycle 2: | | | | | | | | | | | | | | | |
| DEC | 1 | 1 | 0 | 0 | 1 | 0 | 0 | 0 | | | | | 1 | 1 | 0 |
| IC-2 | 1 | 1 | 0 | 0 | 1 | 0 | 0 | 0 | | 0 | 1 | 1 | 1 | 1 | 0 |
| WT-2 | 1 | 1 | 0 | 0 | 1 | 0 | 0 | 0 | | 1 | 0 | 0 | 1 | 1 | 0 |
| DEC′ | 1 | 1 | 0 | 0 | 1 | 0 | 0 | 0 | | | | | 1 | 0 | 0 |
| Cycle 3: | | | | | | | | | | | | | | | |
| DEC | 1 | 0 | 0 | 0 | 0 | 0 | 0 | 0 | | | | | 1 | 0 | 0 |
| IC-3 | 1 | 0 | 0 | 0 | 0 | 0 | 0 | 0 | 0 | 1 | 1 | 1 | 1 | 0 | 0 |
| WT-3 | 1 | 0 | 0 | 0 | 0 | 0 | 0 | 0 | 1 | 0 | 0 | 0 | 1 | 0 | 0 |
| DEC′ | 1 | 0 | 0 | 0 | 0 | 0 | 0 | 0 | | | | | 0 | 0 | 0 |
| DEC | END of ADD | | | | | | | | | | | | | | |

The initial condition established for addition are all 1's in the mask and backup registers and all 1's in the entry register except the entry register SP bit which is set to zero. The initial conditions are established by an output pulse, as in subtraction, from the start pulse generator 91 which pulse operates to set the shift register 93 with a 1 in the DEC position so that the output from that position on line 45 resets the 1 and the SP bits of the mask register 13 to 0. For addition, of course, the switches 99 and 100 are switched to the other position (opposite that shown) connecting the line 89 to OR 98 and line 38 to the start pulse generator 91. Line 38, of course, is operative to set the SP bit to 0 as an initial condition. After the initial conditions are established, the clock 94 causes the shift register 93 to sequentially step through its stages after the initial DEC operation until the end of add is reached as evidenced by the resetting of latch 97 with the END DEC signal.

With the bit selection carried out as shown in Chart II, Chart III depicts the changes which are made within an associative memory containing the nine words, WORD 0, WORD 1,...WORD 8.

the memory words which have set MI. The writing is performed, with reference to FIG. 5 and FIG. 2, with an output pulse from the W stage of register 93 on line 90 which connects to each of the write gates 225 of FIG. 2. The other input to the gates 225 is the 1 position of the MI and accordingly the word write lines 247 for WORDS 0, 2, 4 and 6 are energized. Simultaneous with the energization of those word write lines, the W stage output of the register 93 in FIG. 5 pulses through the OR 98 a control signal onto the line 89 which is applied to the WT/IC line of the T/C gates of FIG. 3. The T/C gates are operative to gate the true value of the entry register bits 1 and SP to the memory of FIG. 2. In accord with the explanation given in FIG. 3, the 1 line 281 of BIT 1 and the 0 line 280 of SP are energized thereby writing in the memory cells 17 the appropriate 1 or 0 for those words having word write lines 247 also energized.

After the first write cycle is completed, the shift register is stepped through the DEC′ and DEC stages to set up the conditions for the second interrogate/write steps and to again repeat the interrogation, setting of the MI and writing the true value of the unmasked entry field into WORD 1 and WORD 5. After the second cycle is completed, the third cycle is entered where the WORD 4 MI is set.

At the completion of the third cycle, all words except WORD 7 and WORD 8 have been incremented by the amount of a binary 1. WORD 8 has not been incremented because it initially had a 0 set in the SP position which thereby indicated that the word was not to be incremented. The WORD 7 is not incremented because such an incrementation would cause an overflow to occur since the WORD 7 already contained the maximum count of three 1's in the three positions available and therefore it could not be incremented without having a higher order (4 regular bits plus a SP bit) position.

By resetting all of the mask regular bit positions to 1 and the mask SP to 0 and interrogating all the words in memory to detect 1's in the SP position, those words which contained an overflow conditions, such as WORD 7, can be detected.

One manner of detecting the overflow is by means of the overflow sequential control circuit of FIG. 6. The FIG. 6 circuit detects the END DEC signal generated by the backup gate 54 of FIG. 3 and sets the first stage of shift register 104 to a 1 thereby generating a control overflow signal on the line 40. Line 40 operates to set all of the mask positions of the mask register circuitry 13 to a 1. Thereafter the clock line input 106 from the clock 94 of FIG. 5 operates to shift the shift register 104 to the second stage energizing the next sequential control

CHART III—ADDITION (MEMORY CONTENTS)

| | Cycle 1 | | | | | | | | | Cycle 2 | | | | | | | | | Cycle 3 | | | | | | | | | | | | | |
|---|---|---|---|---|---|---|---|---|---|---|---|---|---|---|---|---|---|---|---|---|---|---|---|---|---|---|---|---|---|---|---|---|
| | Interrogate-1 | | | | | Write-1 | | | | Interrogate-2 | | | | | Write-2 | | | | Interrogate-3 | | | | | Write-3 | | | | Detect overflow | | | |
| | 3 | 2 | 1 | SP | MI | 3 | 2 | 1 | SP | 3 | 2 | 1 | SP | MI | 3 | 2 | 1 | SP | 3 | 2 | 1 | SP | MI | 3 | 2 | 1 | SP | 3 | 2 | 1 | SP |
| From T/C | | | 0 | 1 | | | | 1 | 0 | | 0 | 1 | 1 | | | 1 | 0 | 0 | 0 | 1 | 1 | 1 | | 1 | 0 | 0 | 0 | 0 | 1 | 1 | 1 |
| Mask | M | M | $\bar{0}$ | $\bar{0}$ | | M | M | 0 | 0 | M | $\bar{0}$ | $\bar{0}$ | $\bar{0}$ | | M | 0 | 0 | 0 | $\bar{0}$ | $\bar{0}$ | $\bar{0}$ | $\bar{0}$ | | 0 | 0 | 0 | 0 | M | M | M | $\bar{0}$ |
| Word: | | | | | | | | | | | | | | | | | | | | | | | | | | | | | | | |
| 0 | 0 | 0 | 0 | 1 | 1 | 0 | 0 | 1 | 0 | 0 | 0 | 1 | 0 | 0 | 0 | 0 | 1 | 0 | 0 | 0 | 1 | 0 | 0 | 0 | 0 | 1 | 0 | 0 | 0 | 1 | 0 |
| 1 | 0 | 0 | $\bar{1}$ | $\bar{1}$ | 0 | 0 | 0 | $\bar{1}$ | $\bar{1}$ | 0 | 0 | 1 | 1 | 1 | 0 | 1 | 0 | 0 | 0 | 1 | 0 | 0 | 0 | 0 | 1 | 0 | 0 | 0 | 1 | 0 | 0 |
| 2 | 0 | 1 | 0 | 1 | 1 | 0 | 1 | 1 | 0 | 0 | $\bar{1}$ | $\bar{1}$ | $\bar{0}$ | 0 | 0 | $\bar{1}$ | $\bar{1}$ | $\bar{0}$ | 0 | 1 | 1 | 0 | 0 | 0 | 1 | 1 | 0 | 0 | 1 | 1 | 0 |
| 3 | 0 | 1 | $\bar{1}$ | $\bar{1}$ | 0 | 0 | 1 | $\bar{1}$ | $\bar{1}$ | 0 | 1 | 1 | 1 | 0 | 0 | 1 | 1 | 1 | 0 | 1 | 1 | 1 | 1 | 1 | 0 | 0 | 0 | 1 | 0 | 0 | 0 |
| 4 | 1 | 0 | 0 | 1 | 1 | 1 | 0 | 1 | 0 | 1 | 0 | 1 | 0 | 0 | 1 | 0 | 1 | 0 | $\bar{1}$ | $\bar{0}$ | $\bar{1}$ | $\bar{0}$ | 0 | $\bar{1}$ | $\bar{0}$ | $\bar{1}$ | $\bar{0}$ | 1 | 0 | 1 | 0 |
| 5 | 1 | 0 | $\bar{1}$ | $\bar{1}$ | 0 | 1 | 0 | $\bar{1}$ | $\bar{1}$ | 1 | 0 | 1 | 1 | 1 | 1 | 1 | 0 | 0 | 1 | 1 | 0 | 0 | 0 | 1 | 1 | 0 | 0 | 1 | 1 | 0 | 0 |
| 6 | 1 | 1 | 0 | 1 | 1 | 1 | 1 | 1 | 0 | 1 | $\bar{1}$ | $\bar{1}$ | $\bar{0}$ | 0 | 1 | $\bar{1}$ | $\bar{1}$ | $\bar{0}$ | 1 | 1 | 1 | 0 | 0 | 1 | 1 | 1 | 0 | 1 | 1 | 1 | 0 |
| 7 | 1 | 1 | $\bar{1}$ | $\bar{1}$ | 0 | 1 | 1 | $\bar{1}$ | $\bar{1}$ | 1 | 1 | 1 | 1 | 0 | 1 | 1 | 1 | 1 | 1 | 1 | 1 | 1 | 0 | 1 | 1 | 1 | 1 | 1 | 1 | 1 | 1 |
| 8 | 1 | 0 | 1 | 0 | 0 | 1 | 0 | 1 | 0 | 1 | 0 | 1 | 0 | 0 | 1 | 0 | 1 | 0 | 1 | 0 | 1 | 0 | 0 | 1 | 0 | 1 | 0 | 1 | 0 | 1 | $\bar{0}$ |

During the first interrogate/write cycle (cycle 1), the complement of the entry register 1 and SP bits is compared with all the 1 and SP bits in the memory words. The interrogation finds a match in the WORDS 0, 2, 4 and 6 so that the match indicators, MI, for those words are set to 1 in the manner indicated in connection with the description of FIG. 2. After the MI are set to indicate the words in memory which compare, the shift register of FIG. 5 is stepped to the W stage in order to write overflow signals on outputs 46 and 48. The output 46 operates to reset the SP bit of the mask register to 0 and the output 48 operates to energize OR 107 whose output 108 sets all the MI to the 1 position. Thereafter, clock line 106 steps the register 104 to the third position energizing the output line 85 connected to the OR 98 of FIG. 5 which causes an interrogation (true for subtract, complement for add) of the SP positions in all the words of memory. Since only those words in memory III, will have a match in this condition, all of the MI are reset to 0 leaving only the WORD 7 MI set to 1.

Processing Values Greater Than 1

In order to add or subtract higher order binary values, the apparatus of FIG. 3 is altered to apply the input DEC pulse on lines 45 to the SP 0 position of the mask register circuitry 13 and bypasses all the lower order bit positions on which processing is not to be carried out. For example, if processing is to be by a binary 2, then the input 45 goes to the 0 input of the SP bit, to the 0 input of the BIT 2, but not to the 0 input of BIT 1 as shown. Similarly, the DEC input to the backup gate 16 would bypass the BIT 1 gate 52 and would go directly to the gate input 53. Any well-known switching circuit may be employed to select the higher order bit and to bypass the lower order bits.

In a similar manner, if processing by binary 4 is desired, the DEC input is connected to the gate 54 and to the 0 input of BIT 3 bypassing the gates 52 and 53 and the 0 inputs of BIT 1 and BIT 2. With these connections as described, the mask would never be removed from the BIT 2 and BIT 1 positions of the entry register (i.e., the mask register BIT 2 and BIT 1 would always remain in the 1 state) in the case of processing by binary 4.

Rather than processing by powers of 2 as discussed above, processing can be by any arbitrary constant by combining powers of 2. For example, to increment a field by 5, incrementation is first carried out by 4 and then by binary 1. Alternatively, sometimes it is advantageous to use recording techniques as in the case of incrementation by 7, where incrementation is carried out by 8 followed with decrementation by 1.

TSS Embodiment

The associative memory apparatus of the present invention may be employed to keep track of the location of users' data in a time sharing system memory such as memory 110 in FIG. 1. A plurality of users may have access to the memory 110 for placing data in the memory via BUS IN 111 or taking data out via BUS OUT 112. If a need exists to bring one user's data in, it may necessitate removing some of a previous user's data from the memory 110 and place it in auxiliary storage (not shown) via the BUS OUT 112. Under many conditions it is likely that the most recently used data will be the data which will be required again so that the data most recently placed in the memory 110 should be retained and the older data should be that which is removed.

In order to keep track of the sequence in which a user's data is placed in the memory 110, each word in the associative memory contains a sequence number identifying when an associated block of TSS memory is stored. Each word in memory corresponds to a TSS memory block (i.e., word, segment or other unit of user data). For example, BLOCK 0 in memory 110 corresponds to WORD 0, BLOCK 1 corresponds to WORD 1 and so forth. Since the order in which blocks of data are addressed in the TSS memory may be random, the number placed in the corresponding associative memory word location is indicative of the order in which a BLOCK of data was placed in the memory 110. For example, the first block of user data may be placed in BLOCK 1 so that a 000 would be placed in WORD 1. A second block of user data may be placed in BLOCK 25 so that a 001 would be placed in associative memory WORD 25. A counter 114 in FIG. 1 (shown in more detail in FIG. 4) is used to assign a sequence number (e.g. the just-mentioned 000 and 001 numbers) to each block of data entered into memory 110 and each count is gated into the entry register 11 from where it is appropriately written into the associative memory word location corresponding to the block in memory 110.

If after loading a number of blocks of user's data into memory 110 it is desired to nondestructively access one, that accessed block of data is read out over the Bus 112 and the corresponding sequence number in the associative memory word is read out into the memory out register 9. From memory out register 9, the entry register 11 is loaded with the read out sequence number via the Bus 115. Thereafter, a range retrieval of all words in memory is performed thereby identifying those words which have a higher count (a higher sequence number) than the entry register number. The range retrieval carried out in the associative memory 3 operates to set the SP bit in each word which has a higher count than the count of the word read out and which has been placed in the entry register 11. The high-sequence-value (the value in the counter 114) is selectively written into the count position of the word location from which the word was read out nondestructively. All other words having a set SP bit (indicating a higher sequence value) are decremented by a binary 1 in order to reduce the sequence number by 1 for those words. If data is destructively read from the associative memory thereby indicating that the corresponding block of data in the TSS memory is no longer required, the procedure is the same as above for nondestructive read out except that the counter is decremented by 1 and no selected write of the count value is performed.

The above procedure is implemented using the circuitry of FIG. 3 in combination with the conventional counter of FIG. 4. The counter of FIG. 4 includes bit positions 3, 2 and 1 corresponding to the regular bits of the associative memory. The counter is advanced by line 118 each time a block of user data is read into memory 110 and the counter can be preset to all 1's (so that the first piece of data will be 000) via input line 120. When data is to be destructively read out, the subtract line 119 can be used to decrement the counter by 1. The counter count is loaded into the entry register through the write count gates 123 via the entry register OR's 29. If it is desired to write a preselected sequence into the entry register, the gates 125 may be employed with sequential timing signals S1, S2, S3 and NS1, NS2, NS3.

The circuits shown in FIG. 3 perform the bit selection operation of updating the sequence numbers in the associative memory in the time sharing application. Each time a block of the TSS memory is used, circuits modify the sequence field to maintain the order in which the blocks were used. This order is maintained by using a range retrieval operation like that disclosed in the above-identified Lindquist and Seeber application entitled "RAMOR (Range Associative Memory With Ordered Retrieval)." The range retrieval operation marks those associative memory words by setting their special bits.

In further detail, when a block from the TSS memory is used, the corresponding word from the associative memory is placed in the memory out register 9 of FIG. 1 which allows us to keep that word temporarily apart from the rest of memory and to write the word in the entry register through the use of the WRITE SEQUENCE control input to the gates 125 of FIG. 4. After the sequence number is in the entry register, the range retrieval operation is begun.

The range retrieval operation is carried out in accordance with the above-identified Lindquist and Seeber application and briefly includes changing the lowest order 0 in the entry register to a 1 and comparing this bit and all higher order bits with all words in memory. Any word that matches will be greater than the original entry word. Thereafter, the next-highest order 0 in the entry register is changed to a 1 and again this changed bit and all higher order bits are compared with the entire memory. Matches again are those words which are greater than the original word. This processing continues until all 0's in the original word have been changed to 1.

The circuits of FIG. 3 perform the above operation. With reference to FIG. 3, an INC signal is applied to the lowest order entry bit to change it to a 1 if it was a 0 or to leave it a 1 if it was a 1. The INC signal is applied to the backup register 1 bit gate 57 which on the first pulse will not be passed since the backup register has been preset as initial conditions to all 0's. The backup register is used during the range retrieval operation to maintain the value of the entry register for a short time after it is changed, and then is used to assume the new value. Thus, if the entry 1 bit was a 0 at the time of the INC signal, the backup 1 bit would remain 0 for a while and thus prevent propagation of the INC signal to the next bit backup gate 58.

When the INC signal goes down, the INC' signal comes up changing the backup 1 bit to a 1. When the backup 1 bit is in the 1 at the time of the INC signal, three new signals are created from the gate 57. Two of these signals are the same as the first two INC signals and are applied to the next (BIT 2) entry and backup bits, while the third is used to set the mask on the mask bit 1 since the range retrieval operation is not interested in the lower order 1's.

After each INC signal is applied, a compare of the unmask entry bits on all words in memory is carried out and the matching words are operative to set the match indicators for those that match. When all the entry register 0's have been changed to 1's, the next INC signal propagates through all levels and produces an END INC pulse similar to the END DEC pulse previously described. This END INC signal terminates the range retrieval operation.

After the range retrieval operation has been completed, the high-priority number (the number in counter 114) is assigned to the last-used word of memory. The data in the memory output register is rewritten back into the entry register, a compare is run on all words in memory with this word setting the match indicator of the last used word. Thereafter, the counter value is gated into the entry register via the WRITE COUNT pulse to the gate 123 and this counter value now in the entry register is written into that matched word which has the set match indicator. During this operation the special bit is kept masked.

To complete the updating of the sequence field, the only remaining step is to decrement by 1 those words marked in the range retrieval operation. The decrementation is carried out in accord with the present invention in the manner previously described in connection with Chart I (subtraction).

A control unit (not shown) similar to that of FIG. 5 may be employed to produce the required control signals to operate the FIG. 3 and other circuits during a TSS embodiment operation. Since any well known sequence control unit may be employed, no further description is deemed necessary.

While the invention has been particularly shown and described with reference to preferred embodiments thereof, it will be understood by those skilled in the art that the foregoing and other changes in form and details may be made therein without departing from the spirit and scope of the invention.

I claim:

1. A method of adding a number to or subtracting a number from one or more words in an associative memory comprising repeating through one or more cycles the sequential steps of:

unmasking, in each cycle, a set value in the lowest order significant entry bit position that was not previously unmasked;

interrogating, in each cycle, all words in memory using the true value, for subtraction, or the complement value, for addition, of the unmasked entry bits to detect those words having a field which compares with the unmasked entry bits;

writing, in each cycle, the complement value, for subtraction, or the true value, for addition, of the unmasked entry bits into the field of those words which compared with the entry bits during the interrogation step of the same cycle;

resetting said set value of the previous cycle, in each cycle after the first until the highest order bit position is reached thereby signifying completion of the addition or subtraction.

2. The method of claim 1 further including the steps of:

setting, before the sequential steps, a special bit in each memory word to be added to or subtracted from;

unmasking during said unmasking step of a first cycle a set entry special bit for subtraction or a reset entry special bit for addition;

and wherein said interrogating and writing steps include interrogating and writing with said entry special bit.

3. The method of claim 2 further including, after completion of addition or subtraction, the step of:

interrogating the special bits for all memory words with the

4. A method of subtracting a number from one or more words in an associative memory, where the associative memory includes a plurality of words each having a special bit and a plurality of ordered bit positions, entry register means containing the same special bit and plurality of ordered bit positions, mask register means containing the same special bit and plurality of ordered bit positions for controlling which field of bits in said entry register means will be gated to the same field of bits in said memory words, backup register means selectively connectable to said mask and entry register means including the same plurality of bit positions, word sense and selection circuitry including match indicators for detecting which words compare during an interrogation step and for selecting which words to write into during a write step, said method comprising the steps of:

setting, as an initial condition, 1's in all said special bit positions of said entry and mask register means and in all said plurality of order bit positions of said entry, mask and backup register means, and cyclically repeating the sequential steps of, unmasking, in each cycle, the lowest order significant entry bit position that was not previously unmasked, interrogating, in each cycle, all words in memory using the true value of the unmasked entry bits to detect those words having a field which compares with the unmasked entry bits, writing, in each cycle, the complement value of the unmasked entry bits into the field of those words which compared with the entry bits during the interrogation step of the same cycle, resetting, in each cycle after the first, the entry bit which was unmasked during the previous cycle, said resetting carried out until the highest order bit position is reached thereby signifying completion of the subtraction.

5. A method of adding a number to one or more words in an associative memory, where the associative memory includes a plurality of words each having a special bit and a plurality of ordered bit positions, entry register means containing the same special bit and plurality of ordered bit positions, mask register means containing the same special bit and plurality of ordered bit positions for controlling which field of bits in said entry register means will be gated to the same field of bits in said memory words, backup register means selectively connectable to said mask and entry register means including the same plurality of bit positions, word sense and selection circuitry including match indicators for detecting which words compare during an interrogation step and for selecting which words to write into during a write step, said method comprising the steps of:

setting, as an initial condition, 1's in all said special bit positions of said entry and mask register means and in all said plurality of order bit positions of said entry, mask and backup register means except for the entry special bit which is reset to 0, and cyclically repeating the sequential steps of, unmasking, in each cycle, the lowest order significant entry bit position that was not previously unmasked, interrogating, in each cycle, all words in memory using the complement value of the unmasked entry bits to detect those words having a field which compares with the unmasked entry bits, writing, in each cycle, the true value of the unmasked entry bits into the field of those words which compared with the entry bits during the interrogation step of the same cycle, resetting, in each cycle after the first, the entry bit which was unmasked during the previous cycle, said resetting carried out until the highest order bit position is reached thereby signifying completion of the addition.

6. An associative memory apparatus including a memory containing a plurality of words each having a special bit and a plurality of ordered bit positions, entry register means containing the same special bit and plurality of ordered bit positions, mask register means containing the same special bit and bits in said memory words, backup register means selectively connectable to said entry and mask register means including the same plurality of bit positions, word sense and selection circuitry including match indicators for detecting which words compare during an interrogation step and for selecting which words to write into during a write step, the improvement for subtracting a number from all selected words in memory, each selected by having a set special bit comprising:

a control unit means operative to establish, as initial conditions, 1's in all said ordered bit positions of said entry, mask and backup register means and in said special bit positions of said entry and mask register means and thereafter to generate a plurality of sequential control signals in each cycle;

first means operative, in each cycle, in response to a first control signal to apply a reset signal to the mask register means special bit and lowest order significant bit that was not previously unmasked so as to unmask a field of bits in said entry register, and operative, in each cycle after the first, to reset the entry bit which was unmasked during the previous cycle;

second means operative, in each cycle, in response to a control signal to condition all match indicators;

third means operative, in each cycle, in response to a subsequent control signal to interrogate all memory words with the true value of all unmasked entry register bits and thereby set a match indicator for each memory word having a field which compares with the unmasked entry field;

and fourth means operative, in each cycle, in response to a control signal to write the complement of the unmasked entry field into all memory words having a set match indicator.

7. The apparatus of claim 6 further including;

inhibit means connected to inhibit operation of said control means, and connecting means connecting said first means to said inhibit means, said connecting means operative, in response to a first control signal occurring in a cycle after the highest order entry bit is unmasked, to inhibit operation of said control unit.

8. The apparatus of claim 7 further including;

overflow sequential control means for generating a plurality of sequential control overflow signals, fifth means connected, in response to a first overflow signal, to set all bits in said mask register means, sixth means connected, in response to a second overflow signal to set all match indicators and to reset the mask register means special bit to 0, and seventh means connected to said third means and operative, in response to a third overflow signal, to interrogate all memory words with the unmasked entry register special bit so as to detect all words exhibiting an overflow condition.

9. An associative memory addition apparatus including a memory containing a plurality of words each having a special bit and a plurality of ordered bit positions, entry register means containing the same special bit and plurality of ordered bit positions, mask register means containing the same special bit and plurality of ordered bit positions for controlling which field of bits in said entry register means is gated to the same field of bits in said memory words, backup register means selectively connectable to said entry and mask register means including the same plurality of bit positions, word sense and selection circuitry including match indicators for detecting which words compare during an interrogation step and for selecting which words to write into during a write step, the improvement for adding a number to all selected words in memory, each selected by having a set special bit, comprising:

a control unit means operative to establish, as initial conditions 1's in all said ordered bit positions of said entry, mask and backup register means and in said special bit position of said mask register means and to establish a 0 in said entry special bit and thereafter to generate a plurality of sequential control signals in each cycle, first means operative, in each cycle, in response to a control signal to apply a reset signal to the mask register means special bit and lowest order significant bit that was not previously unmasked so as to unmask a field of bits in said entry register, and operative, in each cycle after the first, to reset the entry bit which was unmasked during the previous cycle;

second means operative, in each cycle, in response to a control signal to condition all match indicators;

third means operative, in each cycle, in response to a subsequent control signal to interrogate all memory words with the complement value of all unmasked entry register bits and thereby set a match indicator for each memory word having a field which compares with the unmasked entry field;

and fourth means operative, in each cycle, in response to a control signal to write the true value of the unmasked entry field into all memory words having a set match indicator.

10. The apparatus of claim 9 further including:

inhibit means connected to inhibit operation of said control means, and connecting means connecting said first means to said inhibit means, said connecting means operative, in response to a first control signal occurring in a cycle after the highest order entry bit is unmasked, to inhibit operation of said control unit.

11. The apparatus of claim 10 further including:

overflow sequential control means for generating a plurality of sequential control overflow signals, fifth means connected, in response to a first overflow signal, to set all bits in said mask register means, sixth means connected, in response to a second overflow signal to set all match indicators and to reset the mask register means special bit to 0, and seventh means connected to said third means and operative, in response to a third overflow signal, to interrogate all memory words with the unmasked entry register special bit so as to detect all words exhibiting an overflow condition.

12. An associative memory apparatus including a memory containing a plurality of words each having a special bit and a plurality of ordered bit positions, entry register means containing the same special bit and plurality of ordered bit positions, mask register means containing the same special bit and plurality of ordered bit positions for controlling which field of bits in said entry register means is gated to the same field of bits in said memory words, backup register means selectively connectable to said entry and mask register means including the same plurality of bit positions, word sense and selection circuitry including match indicators for detecting which words compare during an interrogation step and for selecting which words to write into during a write step, the improvement for subtracting a number from all selected words in memory, each selected by having a set special bit comprising:

a control unit means operative to establish, as initial conditions, 1's in all said ordered bit positions of said entry, mask and backup register means and in said special bit positions of said entry and mask register means and thereafter to generate a plurality of sequential control signals in each cycle;

gate means including a plurality of backup gates, one for each of said plurality of ordered bit positions, including means connecting the output from each of said backup register means ordered positions to a corresponding one of said backup gates, including means connecting the reset output of each backup gate to the backup gate of the adjacent higher order position, to the reset input of the adjacent higher order position, to the reset input of the adjacent higher order mask register means, and to the reset input of the entry register means bit of the same order, and including means connecting a control signal from said control unit to the mask register means special bit and lowest-order bit and to the lowest order backup gate whereby, in each cycle, the lowest order significant entry register means bit which was not previously unmasked is unmasked and whereby, in each cycle after the first, the entry bit which was unmasked during the previous cycle is reset;

second means operative, in each cycle, in response to a control signal to condition all match indicators;

third means operative, in each cycle, in response to a subsequent control signal to interrogate all memory words with the true value of all unmasked entry register bits and thereby set a match indicator for each memory word having a field which compares with the unmasked entry field;

and fourth means operative, in each cycle, in response to a control signal to write the complement of the unmasked entry field into all memory words having a set match indicator.

13. An associative memory addition apparatus including a memory containing a plurality of words each having a special bit and a plurality of ordered bit positions, entry register means containing the same special bit and plurality of ordered bit positions, mask register means containing the same special bit and plurality of ordered bit positions for controlling which field of bits in said entry register means is gated to the same field of bits in said memory words, backup register means selectively connectable to said entry and mask register means including the same plurality of bit positions, word sense and selection circuitry including match indicators for detecting which words compare during an interrogation step and for selecting which words to write into during a write step, the improvement for adding a number to all selected words in memory, each selected by having a set special bit, comprising:

a control unit means operative to establish, as initial conditions 1's in all said ordered bit positions of said entry, mask and backup register means and in said special bit position of said mask register means and to establish a 0 in said entry special bit and thereafter to generate a plurality of sequential control signals in each cycle;

gate means including a plurality of backup gates, one for each of said plurality of ordered bit positions, including means connecting the output from each of said backup register means ordered positions to a corresponding one of said backup gates, including means connecting the reset output of each backup gate to the backup gate of the adjacent higher order position, to the reset input of the adjacent higher order mask register means, and to the reset input of the entry register means bit of the same order, and including means connecting a control signal from said control unit to the mask register means special bit and lowest-order bit and to the lowest order backup gate whereby, in each cycle, the lowest order significant entry register means bit which was not previously unmasked is unmasked and whereby, in each cycle after the first, the entry bit which was unmasked during the previous cycle is reset;

second means operative, in each cycle, in response to a control signal to condition all match indicators;

third means operative, in each cycle, in response to a subsequent control signal to interrogate all memory words with the complement value of all unmasked entry register bits and thereby set a match indicator for each memory word having a field which compares with the unmasked entry field;

and fourth means operative, in each cycle, in response to a control signal to write the true value of the unmasked entry field into all memory words having a set match indicator.

PO-1050
(5/69)

UNITED STATES PATENT OFFICE
CERTIFICATE OF CORRECTION

Patent No. 3,576,436 Dated April 27, 1971

Inventor(s) Arwin B. Lindquist

It is certified that error appears in the above-identified patent and that said Letters Patent are hereby corrected as shown below:

Column 13, line 75, this line should read --interrogating the speci bits for all memory words with the true value of an unmasked set ent bit so as to detect words containing an overflow condition.--. Colum line 1, before this line insert --plurality of ordered bit positions fo controlling which field of bits in said entry register means is gated to the same field of--. Column 16, line 69, after "position," delete "to reset input of"; Column 16, line 70, delete "the adjacent higher order position,".

Signed and sealed this 24th day of August 1971.

(SEAL)
Attest:

EDWARD M.FLETCHER,JR.
Attesting Officer

WILLIAM E. SCHUYLER, JR.
Commissioner of Patents